United States Patent Office 2,979,107
Patented Apr. 11, 1961

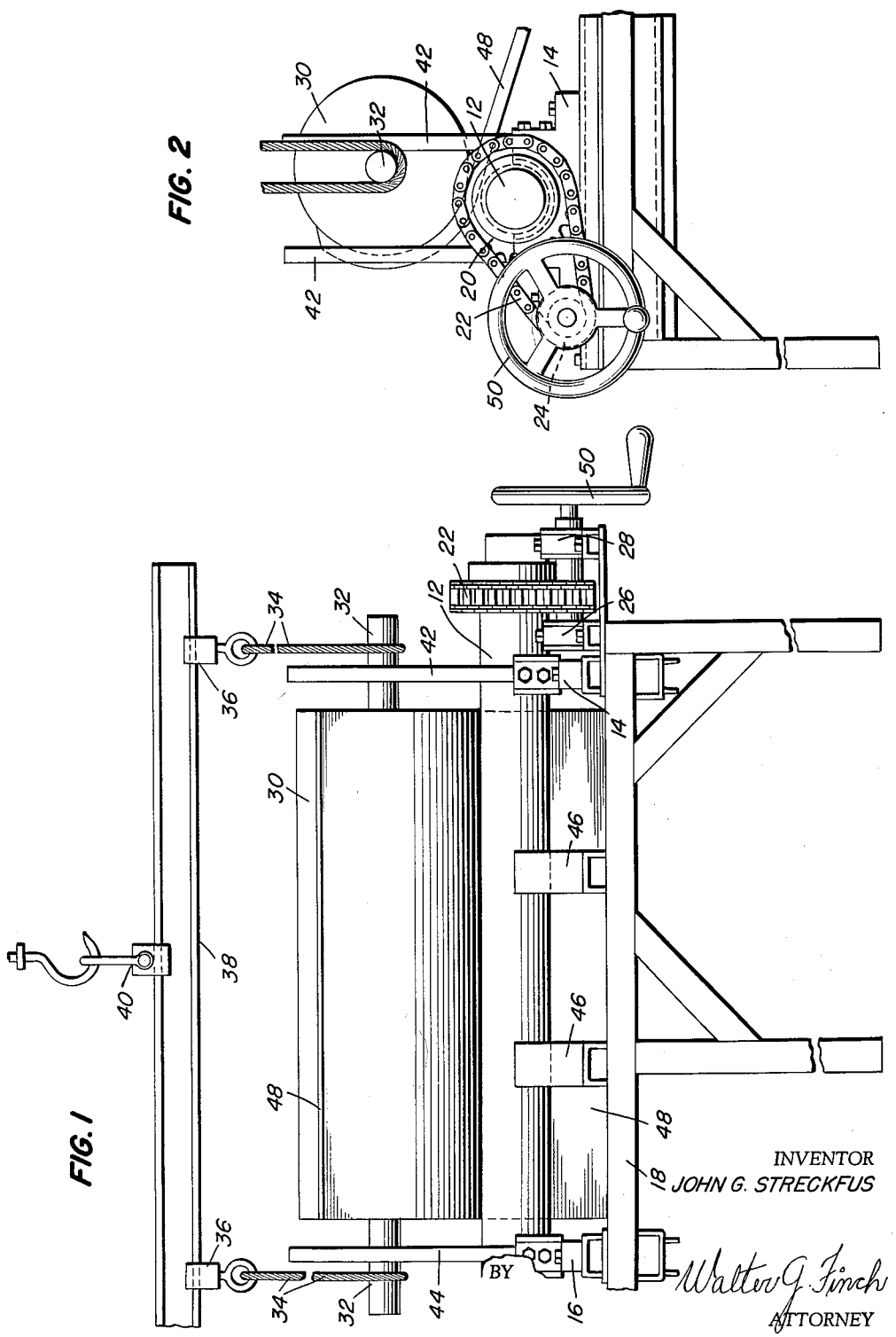

2,979,107

APPARATUS FOR COVERING STEEL COVERED ROLLERS WITH BONDED PLY RUBBER

John G. Streckfus, 4306 Wentworth Road, Baltimore, Md.

Filed June 27, 1958, Ser. No. 745,063

1 Claim. (Cl. 154—1.8)

This invention relates to building mandrel machines, more particularly the invention pertains to apparatus for covering steel covered rollers with bonded ply rubber.

Rubber covered rollers are widely employed in industry. They vary greatly in shape, size and weight, but basically are similar in having a solid steel cylindrical core overlaid with a bonded rubber. An axial extension of the steel core on both ends of the cylinder is used as a journal.

In the manufacture of these rollers, it is customary to coat the steel core with a bonding agent and then wrap sheet rubber around the cylindrical surface until a desired thickness is built up. A temporary layer of cloth is then applied over all and the roller is transferred to a vulcanizing oven.

These rollers are often up to two feet in diameter and ten feet in length. Besides being awkward, their weight, up to 1,000 pounds, requires that mechanical aids be employed in handling the rollers to and from the above mentioned processes. The present invention efficiently cooperates with the handling means requiring no disengagement therefrom. This feature of the invention is obtained by using open-ended vertical restrainers instead of bearings for the rollers and handling them by means of their journals.

It is important that during the application of the rubber ply to the treated core, that no air entrapment therein be permitted. For a satisfactory rubber covering, there must also be no pinching or uneven stretching of the covering. In this respect, the use of double building mandrels to support the roller and apply the rubber has caused trouble through the roller shifting its weight from one to the other mandrel in an oscillatory manner causing waves in the rubber applied to the roller ply. It is obvious, too, that the single roller of this invention doubles the pressure at the rubber application line. A further feature of this invention is a self-adaption to any diameter of the roller through the use of the above-mentioned vertical restrainers.

It is an object of this invention to provide a building mandrel machine for rubber coating rollers which can be loaded and unloaded easily.

Another object of this invention is to provide a building mandrel machine which is self-adjusting to diameters of the rollers.

Still another object of this invention is to provide a building mandrel machine having a single line contact pressure applicator.

To provide a building mandrel machine which is economical to manufacture, efficient and reliable in operation, and easy to install and maintain are other objects of this invention.

These and other objects and advantages of this invention will become more readily apparent and understood from the accompanying specification and drawings in which:

Fig. 1 is a front elevation of a building mandrel machine including features of this invention; and Fig. 2 is a side elevation of the mandrel machine.

Referring now to Figs. 1 and 2 of the drawings, a building mandrel 12 is mounted in a half bearing 14 near one end and in another half bearing 16 at the opposite end thereof. Bearings 14 and 16 are fastened to a bench 18, with the further provision that bearing 16 can be moved to one of several positions parallel to mandrel 12.

A sprocket 20, mounted on the end of mandrel 12, mates with a drive chain 22 and a journaled sprocket 24. A pair of bearings 26 and 28 support journaled sprocket 24.

A roller 30, which is to be processed, is provided with journals 32 at its opposite ends. This roller 30 is supported by the journals 32 from a pair of slings 34, depending from a pair of slidable blocks 36 on a spreader bar 38. Spreader bar 38 has a centrally located lifting eye element 40 adapted for the hook of a chain hoist, which is not shown.

In use, the chain hoist is adjusted to support the journals 32 or roller 30 between a pair of parallel retainer rods 42 mounted vertically in the block of half bearing 14 and between another pair of vertically parallel retainer rods 44 secured to the block of movable half bearing 16.

In this manner, the roller 30 is capitivated horizontally and is free to press downward onto mandrel 12 by force of gravity. To help support the weight of the roller 30, a support block 46 channeled to fit mandrel 12 is used.

A sheet or rubber ply 48 is shown passing over building mandrel 12 and under roller 30 to illustrate the affixing of the rubber covering when the apparatus is driven by a hand wheel 50. The retainer bar to the right in Fig. 2 restrains the horizontal component of the rotary winding force.

Obviously many modifications and variations of the present invention are possible in light of the above teachings. It is, therefore, to be understood that within the scope of the appended claim, the invention may be practiced otherwise than as specifically described.

What is claimed is:

A mandrel machine for making a roller covered with a known material and having a journal at its opposite ends, comprising, a base, an arrangement including a mandrel, means for rotating said mandrel on said base, means including a spreader bar having a pair of spaced slings depending therefrom to engage said end journals of said roller so that said roller can be mounted parallel to and against the surface of said mandrel, and means for retaining said roller in an operative position against the surface of said mandrel including pairs of spaced, parallel retainer rods depending from said base and having said roller positioned therebetween so that when a sheet of material is positioned between said mandrel and roller and said mandrel is rotated, the sheet of material adheres to the surface of said roller due to the weight of gravity pushing said roller down against said mandrel.

References Cited in the file of this patent

UNITED STATES PATENTS

| | | |
|---|---|---|
| 1,407,163 | Ny | Feb. 21, 1922 |
| 1,628,554 | Pagano | May 10, 1927 |
| 1,905,871 | Holland | Apr. 25, 1933 |
| 2,213,712 | Marshall | Sept. 3, 1940 |
| 2,426,401 | Mack | Aug. 26, 1947 |
| 2,685,548 | Drozdowski | Aug. 3, 1954 |
| 2,702,772 | Pronio | Feb. 22, 1955 |
| 2,723,931 | Mercer | Nov. 15, 1955 |
| 2,770,284 | Myrick | Nov. 13, 1956 |